G. T. PALMER.
Domestic Boiler.

No. 78,993.

Patented June 16, 1868.

Fig. 2. Section

Witnesses:

Inventor:

United States Patent Office.

GEORGE T. PALMER, OF BROOKLYN, NEW YORK.

Letters Patent No. 78,993, dated June 16, 1868; antedated June 6, 1868.

IMPROVEMENT IN BOTTOMS FOR BOILERS.

The Schedule referred to in these Letters Patent and making part of the same.

TO ALL WHOM IT MAY CONCERN:

Be it known that I, GEORGE T. PALMER, of Brooklyn, in the county of Kings, and State of New York, have invented a new and useful Article to Place in the Bottom of a Boiler-Pot, for the purpose of preventing food or other articles from being burned when being boiled; and I do hereby declare that the following is a full and exact description thereof, reference being had to the accompanying drawings and the letters of reference marked thereon.

Similar letters denote like parts.

Figure 2 is a central vertical section of the same, showing its position in a pot, which is also shown in section.

Figure 1:
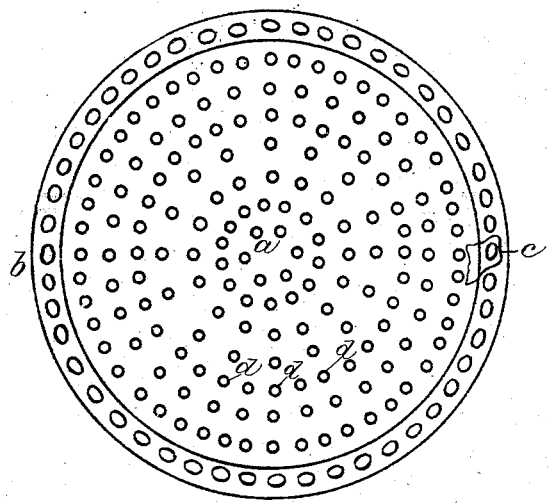
Figure 1 is a top view of my extra bottom for a boiler-pot.
Figure 1:
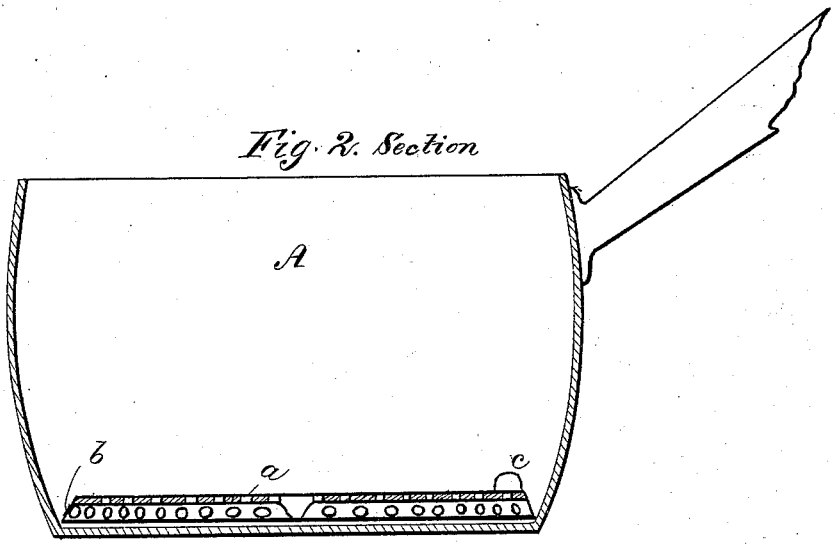

In figs. 1 and 2, $a$ is the top or flat part of the extra bottom, which is perforated with holes, $d\ d$. $b$ is a depressed rim. $c$ is a handle. A is a cooking-pot.

The extra bottom is shown in fig. 2, in position as when being used.

The rim $b$, by being turned down, stiffens the article, and serves the purpose of raising the flat part, $a$, to the desired height from the bottom of the pot.

The depressed rim may be made in various ways, such as having holes through it, as shown in figs. 1 and 2, or the rim may be made plain, and have a corrugated edge, or small knobs to raise the edge from close contact with the bottom of the pot.

The circulation of the liquid in a pot provided with an extra bottom, as shown, will be much more perfect than would be the case without it, as all solids resting on the bottom of the pot are impediments to the free circulation of the fluids contained therein, and are liable to being burned.

The loop or handle $c$ may be fixed in its position, or it may be hinged, so that it may be turned flat upon the part $a$, for the purpose of being packed more closely.

The extra bottom is made of tin, zinc, or other suitable material, but tin has special qualities which make it best adapted for the purpose.

Having thus described my invention, I claim, as a new article of manufacture—

A perforated plate, $a\ b$, with a depressed rim and handle, $c$, made substantially in the manner shown, and for the purpose set forth.

GEORGE T. PALMER.

Witnesses:
CHAS. E. FROST,
JAS. PALMER.